United States Patent Office
3,145,201
Patented Aug. 18, 1964

3,145,201
PROCESS FOR THE MANUFACTURE OF
4-HYDROXY-3-KETO-Δ⁴-STEROIDS
Bruno Camerino, Milan, Bianca Patelli, Stradella, and
Roberto Sciaky, Milan, Italy, assignors to Società
Farmaceutici Italia, Milan, Italy, a corporation of Italy
No Drawing. Filed Aug. 4, 1961, Ser. No. 129,478
Claims priority, application Italy Aug. 11, 1960
15 Claims. (Cl. 260—239.55)

The present invention relates to a new process for the manufacture of 4-hydroxy-3-keto-Δ⁴-steroids, selected from the group of 4-hydroxy-3-keto-4-androstenes, 4-hydroxy-3-keto-19-nor-4-androstenes and 4,17α-dihydroxy-4-pregnene-3,20-diones or its 21-hydroxylated derivative, from the corresponding 3-keto-5β-steroids, by the reaction of these corresponding steroids with oxygen in the presence of a potassium salt of a tertiary aliphatic alcohol.

Several 4-hydroxy-3-keto-Δ⁴-steroids have been described in literature as therapeutically useful substances for their hormonal properties. 4-hydroxy-testosterone and its corresponding esters have been reported by H. Levy et al. (U.S. Patent 2,762,818).

B. Camerino et al. have described the chemical and therapeutical properties of the following: 4-hydroxy-19-nortestosterone and esters thereof (U.S. patent application No. 618,442 filed October 26, 1956, now abandoned and U.S. patent application No. 817,744 filed June 3, 1959, now Patent No. 3,060,201), 4-hydroxy-17α-methyl-testosterone and esters thereof (U.S. patent application No. 761,480 filed September 17, 1958, now Patent No. 3,061,616), 4-hydroxy-17α-methyl-19-nortestosterone and esters thereof (U.S. patent application No. 817,744 filed June 3, 1959, now Patent No. 3,060,201), 4,11β-dihydroxy-17α-methyl-testosterone and esters thereof (U.S. patent application No. 817,744), and 4,17α-dihydroxy-progesterone and esters thereof (U.S. patent application No. 781,-945 filed December 22, 1958, now Patent No. 3,030,390).

F. B. Colton has described the 4-hydroxy-derivatives of Reichstein's Compound S (U.S. Patent 2,727,912) hydrocortisone (U.S. Patent 2,782,213) and cortisone (U.S. Patent 2,829,150).

The processes for the manufacture of 4-hydroxy-3-keto-Δ⁴-steroids (V), are generally limited to the three processes given in the following Table I.

(1) From 3-hydroxy-4-keto-steroids (I) by oxidation with $Bi_2O_3$ (P. L. Julian et al., U.S. Patent 2,900,399);

(2) From 4,5-dihydroxy-3-keto-steroids (II) by dehydration either with acids, such as p-toluenesulphonic acid of hydrochloric acid (H. Levy et al., U.S. Patent 2,762,818) or with alkali such as potassium hydroxide in hydroalcoholic solution (U.S. patent application No. 817,744 filed June 3, 1959;

(3) From 4,5-epoxy-3-keto-steroids (III) by reaction either with acids, such as sulphuric acid in acetic acid or with boron trifluoride (B. Camerino et al., U.S. Patent 2,842,571 and J. Am. Chem. Soc. 78, 1956, p. 3540) or with alkali (U.S. patent application No. 92,175 filed February 28, 1961).

It is known that the manufacture of the starting materials used in these above reactions such as, 3-hydroxy-4-keto-steroids and 4,5-dihydroxy-3-keto-steroids, is not too economical from an industrial point of view, since in order to produce these starting materials expensive reactions are necessary and often low yields of final products are obtained.

TABLE I

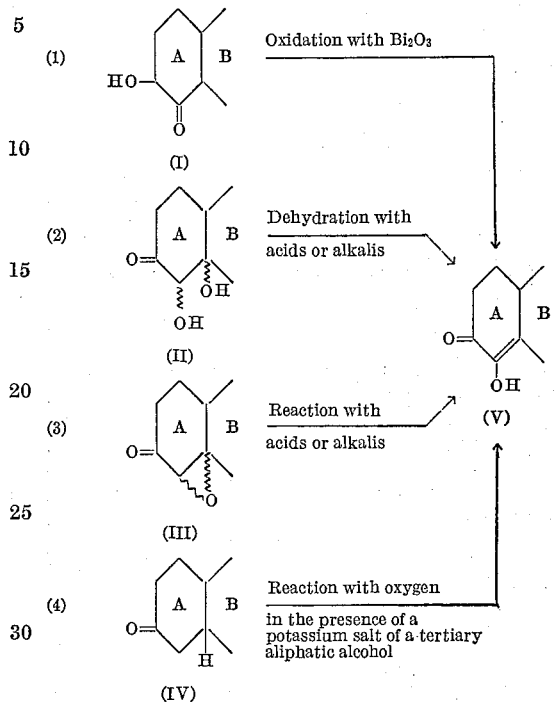

B. Camerino et al. have also found (U.S. patent application 761,480 filed September 17, 1958 and 817,744 filed June 3, 1959) that the manufacture of the 4-hydroxy-analouges of 17α-methyl-testosterone and 17α-methyl-19-nortestosterone derivatives, by reaction with acids of the corresponding 4,5-epoxy-3-keto-steroids, is ineffective, owing to the simultaneous elimination of the 17-hydroxy group.

We have now found a process which provides for the preparation of 4-hydroxy-3-keto-Δ⁴-steroids (V) selected from the group consisting of 4-hydroxy-3-keto-Δ⁴- androstenes, 4-hydroxy-3-keto-19-nor-Δ⁴-androstenes and 4,17α-dihydroxy-Δ⁴-pregnene-3,20-diones and its 21-hydroxylated derivative, from the corresponding 3-keto-5β-steroids, having in the case of pregnanes a 17,20,20,21-bismethylenedioxy, substituted bismethylendioxy group of dioxyacetonic chain in C-17 position of the steroid, in good yields (50–90%) and by a novel and unexpected reaction.

It is therefore an object of the present invention to provide a process for the preparation of 4-hydroxy-3-keto-steroids.

Other objects and advantages will be apparent from the following description and examples.

The starting materials for the present invention, i.e., the 3-keto-5β-androstanes and the 3-keto-19-nor-5β-androstanes and the 17α-hydroxy-5β-pregnane-3,20-diones (not 21-hydroxylated) may be obtained in the known manner from the corresponding 3-keto-Δ⁴-steroids by hydrogenation of these Δ⁴-steroids with hydrogen in the presence of catalyzers such as 5–10% palladium on charcoal either in the presence or absence of tertiary amines such as triethylamine.

The starting materials for the 21-hydroxylated steroids series, i.e., the 17,20,20,21-bismethylendioxy- or substituted bismethylendioxy - 17α,21 - dihydroxy-5β-pregnene-3,20-diones may be prepared by introducing the substituted or unsubstituted bismethylendioxy group in a known manner, such as shown for example in R. E. Beyler et al., U.S. Patents 2,888,456 and 2,888,457, into the 17α,21-dihydroxy-5β-pregnane-3,20-diones shown in literature (see N. L. Wendler et al., J. Am. Chem. Soc. 74, 1952, p. 3630; E. B. Hershberg et al.: J. Am. Chem. Soc. 74, 1952, p. 3849; L. H. Sarett: J. Am. Chem. Soc. 71, 1951, p. 2443). These starting materials may also be prepared by catalytic hydrogenation of the Δ⁴-steroids of the substituted or unsubstituted 17,20,20,21-bismethylendioxy-17α,21-dihydroxy-4-pregnene-3,20-diones shown in Beyler et al. and the above-mentioned American Chemical Society literature, in a known manner such as shown in B. Camerino et al., German Patent 1,004,177.

The process of the present invention may be carried out using the 3-keto-5β-steroids ether in pure form or in admixture with the 5α-isomeric form. This isomeric mixture is obtained by the hydrogenation of 3-keto-Δ⁴-steroids in the presence of palladium and charcoal, owing to the fact that the 5β-form is prevalently produced by the hydrogenation.

It has been found that the 3-keto-5α-steroids, treated according to the same process conditions of the present invention, do not give the corresponding 4-hydroxy-3-keto-Δ⁴-steroids.

According to the present invention, the starting materials, i.e., either the 3-keto-5β-androstanes, the 3-keto-19-nor - 5β-androstanes, the 17α-hydroxy-5β-pregnane-3,20 diones (not 21-hydroxylated), or the 17,20,20,21-bismethylendioxy- or substituted 17,20,20,21-bismethylendioxy (such as bisethylidendioxy, bispropionaldoxy, bisbutyraldoxy, biscaproaldoxy and the like), 17α,21-dihydroxy-5β-pregnane-3,20 diones are dissolved in tertiary aliphatic alcohols, such a t. butyl alcohol or t. amyl alcohol, and reacted with oxygen or air in the presence of the potassium salt of a t. aliphatic alcohol, such as potassium t. butylate or potassium t. amylate, at a temperature range from 10° to 50° C., preferably at room temperature for a period of time variable from few hours to several days.

The oxidation at the C-4 position of the steroid, which is achieved by the present invention, may be carried out either with atmospheric oxygen or pure oxygen. The air or oxygen may be either blown into the solution, in which case it is preferable to remove any carbon dioxide and moisture present or it may be reacted on the surface of the solution as by allowing the solution of the steroid to stand in large, open containers.

The molecular ratio of potassium t. alcoholate to steroid may vary from 1 to 30, preferably between 5 and 10.

If an acylated hydroxy group is present, it is hydrolized during the reaction.

At the end of the reaction, the reaction mixture is neutralized with acids, such as acetic acid or diluted inorganic acids, is diluted with water and the steroid is then extracted using suitable water immiscible organic solvents.

The crude products, i.e., the 4-hydroxy-3-keto-4-androstenes, the 4-hydroxy-3-keto-19-nor-Δ⁴-androstenes, the 4,17α-dihydroxy-Δ⁴-pregnene-3,20-diones (not 21-hydroxylated), or the substituted or unsubstituted 17,20,20,21-bismethylendioxy - 4,17α,21-trihydroxy-4-pregnene-3,20-diones may be isolated in pure form either by crystallization from organic solvents or by chromatographic separation using resins such as Florisil (trademark) followed by successive elution and crystallization.

The 4,17α,21 - trihydroxy-Δ⁴-pregnene-3,20-diones are obtained from the corresponding substituted or unsubstituted crude or pure 17,20,20,21-bismethylendioxy derivatives, by hydrolysis in a known manner such as shown by R. E. Beyler et al. in U.S. Patent 2,866,799, using aqueous acids, such as sulphuric acid, hydrochloric acid, formic acid, and acetic acid. The 4-hydroxy-steroids, which are obtained by the process of the present invention, may be acylated with a chloride or an anhydride of an organic acid in the presence or not of tertiary amines.

According to the present invention, 4-hydroxy-17α-methyl-testosterone,
4-hydroxy-17α-methyl-19-nortestosterone,
4,11β-dihydroxy-17α-methyl-testosterone,
4-hydroxy-testosterone,
4-hydroxy-19-nortestosterone,
4,11β-dihydroxy-testosterone,
4,17α-dihydroxy-progesterone,
4-hydroxy-hydrocortisone,
4-hydroxy-cortisone, 4-hydroxy Reichstein's compound S and the 17,20,20,21-bismethylendioxy derivatives of the last three products have been prepared.

The following specific examples serve to illustrate the present invention but are not intended to limit its scope.

*Example 1*

4-HYDROXY-17α-METHYL-TESTOSTERONE 4 g. of 17α-methyl-testosterone, dissolved in 160 cm.³ of dioxane, are reduced at room temperature and pressure with 0.35 g. of 10% palladium over carbon in the presence of 4 cm.³ of triethylamine.

After absorption of 1 mole of hydrogen, the reaction mixture is filtered and the solution is concentrated under vacuum until an oily residue remains. This residue is used as is for the following reaction.

1 g. of crude 17α-methyl-5β-androstane-17β-ol-3-one (obtained as above described) are dissolved in 60 cm.³ of t. butylalcohol. There is added thereto 15 cm.³ of a t. butylalcohol which contains 450 mg. of potassium which has been dissolved therein and the reaction mixture is kept in an open container at room temperature for 2 days. The reaction mixture is then neutralized with acetic acid, diluted with ethyl acetate, washed with an aqueous salt solution first, then with 10% sodium bicarbonate and finally washed with water until it is neutral.

After distillation of the solvent, 1 g. of a residue is obtained having an U.V. absorption maximum at 280 m$\mu$ ($\epsilon$=9,721). The product may be purified either by ether/petroleum ether crystallization; or by chromatography using Florisil, followed by elution with benzene-ether (5:1) and a final crystallization from ether.

0.7 g. of 4-hydroxy-17α-methyl-testosterone are obtained. (M.P.=173–175° C.; $\lambda_{max}$ at 278 m$\mu$, $\epsilon$=12,950). The reaction also takes place if air is blown into the mixture in which case, carbon dioxide is preferably removed or pure oxygen is used in the starting solution. Equivalent results are obtained when the reaction is carried out in the presence of potassium t. amylate.

*Example 2*

4-HYDROXY-17α-METHYL-19-NORTESTOSTERONE 1 g. of crude 17α-methyl-19-nor-5β-androstane-17β-ol-3-one (obtained by hydrogenation of 17α-methyl-19-nortestosterone, dissolved in dioxane, in the presence of 10% palladium over charcoal) is treated in the same manner as described in Example 1 for the 17α-methyl-5β-androstane-17β-ol-3-one. At the end of the process, 4-hydroxy-17-methyl-19-nortestosterone is obtained (M.P. =168–170° C. $\lambda_{max}$ at 277 m$\mu$, $\epsilon$=12,820).

*Example 3*

4,11β-DIHYDROXY-17α-METHYL-TESTOSTERONE 1 g. of crude 17α-methyl-5β-androstane-11β, 17β-diol-3-one (obtained by hydrogenation of 17α-methyl-11β-hydroxy-testosterone, dissolved in dioxane, in the presence of 10% palladium over charcoal) is treated in the same manner as described in Example 1.

At the end of the process, 4,11β-dihydroxy-17α-methyltestosterone is obtained (M.P.=183–185° C., $\lambda_{max}$ at 278 m$\mu$, $\epsilon$=12,380).

Example 4
4-HYDROXY-TESTOSTERONE 1 g. of crude 5$\beta$-androstane-17$\beta$-ol-3-one (obtained by hydrogenation of testosterone, dissolved in dioxane, in the presence of 10% palladium over charcoal) is treated in the same manner as described in Example 1.

At the end of the process, 4-hydroxy-testosterone is obtained (M.P.=221–223° C., $\lambda_{max}$ at 278 m$\mu$, $\epsilon$=11,900).

Example 5
4-HYDROXY-19-NORTESTOSTERONE 1 g. of crude 19-nor-5$\beta$-androstane-17$\beta$-ol-3-one (obtained by hydrogenation of 19-nortestosterone, dissolved in dioxane, in the presence of 10% palladium over charcoal) is treated in the same manner as described in Example 1.

At the termination of the process, 4-hydroxy-19-nortestosterone is obtained (M.P.=188–190° C.; $\lambda_{max}$ at 278 m$\mu$, $\epsilon$=11,600).

Example 6
4,11$\beta$-DIHYDROXY-TESTOSTERONE 1 g. of crude 5$\beta$-androstane-11$\beta$,17$\beta$-diol-3-one (obtained by hydrogenation of 11$\beta$-hydroxy-testosterone, dissolved in dioxane, in the presence of 10% palladium over charcoal) is treated in the same way as described in Example 1.

At the end of the process, 4,11$\beta$-dihydroxy-testosterone is obtained (M.P.=210–212° C.; $\lambda_{max}$ at 278 m$\mu$, $\epsilon$=9,800).

Example 7
4,17$\alpha$-DIHYDROXY-PROGESTERONE

For two hours pure oxygen is blown into 0.5 g. of 17$\alpha$-hydroxy-5$\beta$-pregnane-3,20-dione (obtained by hydrogenation of 17$\alpha$-hydroxy-progesterone, dissolved in dioxane, in the presence of 10% palladium over charcoal) dissolved in 30 cm.$^3$ of butyl alcohol and 8 cm.$^3$ of t. butylalcohol containing dissolved therein 220 mg. of potassium.

The reaction mixture is neutralized with acetic acid, diluted with H$_2$O and the steroid product extracted with ethyl acetate. The extract is washed with an aqueous salt solution, then with aqueous 10% sodium bicarbonate and finally with water until it is neutral. After distillation of the solvent, a residue is obtained (mg. 500) which is crystallized from ether.

250 mg. of 4,17$\alpha$-dihydroxy-progesterone are obtained (M.P.=229–231° C.; $\lambda_{max}$ at 278 m$\mu$, $\epsilon$=11,850).

When 17$\alpha$-acetoxy-progesterone is used as the starting material, a contemporaneous saponification of the acetyl group is obtained in 17-position, with the formation of 4,17$\alpha$-dihydroxy-progesterone.

Example 8
4-HYDROXY-DERIVATIVE OF REICHSTEIN'S COMPOUND S 3.1 g. of 17,20,20,21-bismethylendioxy-4-pregnene-3-one (prepared as described above by R. E. Beyler et al.), dissolved in 250 cm.$^3$ of dioxane, are hydrogenated at room temperature and pressure in the presence of 0.3 g. of 10% palladium over charcoal and 3 cm.$^3$ of triethylamine. After the absorption of 1 mole of hydrogen, the reaction mixture is filtered and the solution concentrated under vacuum until a solid residue is obtained. This residue is used for the following reaction:

1 g. of crude 17,20,20,21-bismethylendioxy-5$\beta$-pregnene-3-one (obtained as above described) is dissolved in 40 cm.$^3$ of t. butyl alcohol, and 15 cm.$^3$ of t. butyl alcohol containing 450 mg. of potassium dissolved therein. This mixture is left at room temperature for two days. The reaction mixture is neutralized with acetic acid, diluted with ethyl acetate, washed with an aqueous salt solution, then with aqueous 10% sodium carbonate and finally with water until it is neutral. After distillation of the solvent, a residue remains which crystallizes from a mixture of methylene chloride and methanol.

17,20,20,21-bismethylendioxy-4-pregnene-4-ol-3-one is obtained (M.P.=280–285° C.; $\lambda_{max}$ at 278 m$\mu$, $\epsilon$=12,900).

200 mg. of this product, are heated for two hours at 100° C. in 20 cm.$^3$ of aqueous 60% formic acid, and yields the 4-hydroxy-derivatives of Reichstein's compound S (M.P.=220–225° C.; $\lambda_{max}$ at 278 m$\mu$, $\epsilon$=12,800).

Example 9
4-HYDROXY-HYDROCORTISONE 1 g. of crude 17,20,20,21-bismethylendioxy-5$\beta$-pregnane-11$\beta$-ol-3-one is dissolved in 40 cm.$^3$ of t.butyl alcohol and 15 cm.$^3$ of t. butyl alcohol containing 450 mg. of potassium dissolved therein, and left at room temperature for two days in an open container.

The reaction mixture is neutralized with acetic acid, diluted with ethyl acetate, washed with an aqueous salt solution, then with aqueous 10% sodium carbonate and finally with water until it is neutral. After distillation of the solvent, a residue remains which is crystallized from a mixture of methylene chloride and methanol.

17,20,20,21 - bismethylendioxy - 4 - pregnene - 4,11$\beta$-diol-3-one, melting at 268–270° C., is obtained. 200 mg. of this product, heated for two hours at 100° C. in 20 cm.$^3$ of aqueous 60% formic acid, yield the 4-hydroxy-hydrocortisone, melting at 205–208° C.

By the acetylation with acetic anhydride of the 17,20, 20,21-bismethylendioxy-4-pregnene-4,11$\beta$-diol-3-one dissolved in pyridine, the corresponding 4-acetate is obtained (M.P.=208–210° C.).

Example 10
4-HYDROXY-CORTISONE

To 2 g. of crude 17,20,20,21-bismethylendioxy-5$\beta$-pregnane-3,11-dione, dissolved in 100 cm.$^3$ of t. butyl alcohol, are added 30 cm.$^3$ of t. butyl alcohol, containing 900 mg. of potassium dissolved therein and the reaction mixture is left at room temperature for two days. This reaction mixture is treated as described in the preceding examples.

After distillation of the solvent, a residue remains which is crystallized from a methylene chloride-methanol mixture.

17,20,20,21 - bismethylendioxy - 4 - pregnene - 4 - ol-3,11-dione is obtained (melting at 275–277° C.).

200 mg. of this product are heated for two hours at 100° C. in 20 cm.$^3$ of aqueous 60% formic acid and yield the 4-hydroxy-cortisone melting at 215–218° C.

The 17-20, 20-21 bismethylene or substituted bismethylene dioxy group may be removed from the 4-hydroxy-3-beta-$\Delta^4$-steroid either before or after isolation or recovery of the steroid.

Many variations and modifications can, of course, be practised without departing from the spirit of the present invention.

Having thus described the present invention, what is desired to secure and claim by Letters Patent is:

1. A process for the manufacture of a 4-hydroxy-3-keto-$\Delta^4$-steroid, selected from the group consisting of 4-hydroxy-3-keto-4-androstenes, 4-hydroxy-3-keto-19-nor-4-androstenes, 4,17$\alpha$,21-trihydroxy-4-pregnene-3,20-diones and 4,17$\alpha$-dihydroxy-4-pregnene-3,20-diones, which comprises dissolving the corresponding 3-keto-5$\beta$-steroid selected from the group consisting of the 3-keto-5$\beta$-androstanes, 3-keto-19-nor-5$\beta$-androstanes, the 17$\alpha$-hydroxy-5$\beta$-pregnane-3,20-diones, the 17,20,20,21-bismethylenedioxy, 17$\alpha$,21-dihydroxy-5$\beta$-pregnane-3,20-diones and the substituted 17,20,20,21-bismethylenedioxy, 17$\alpha$,21-dihydroxy-5$\beta$-pregnane-3,20-diones in a tertiary aliphatic alcohol and oxidizing said 3-keto-5$\beta$ steroid in the presence of the potassium salt of a t. aliphatic alcohol, and separating the resulting 4-hydroxy-3-keto-$\Delta^4$-steroid thus produced.

2. A process according to claim 1, wherein the 3-keto-

5β-steroid is present in admixture with its 3-keto-5α-steroid isomer.

3. A process according to claim 1, wherein the 3-keto-5β-steroid is present in substantially pure form.

4. A process according to claim 1, wherein a member selected from the group consisting of air and oxygen is used in the oxidation.

5. A process according to claim 1, wherein the tertiary alcohol is selected from the group consisting of t. butyl alcohol and t. amyl alcohol.

6. A process according to claim 1, wherein the potassium salt is selected from the group consisting of potassium t. butylate and potassium t. amylate.

7. A process according to claim 1, wherein the ratio potassium t. alcoholate to steroid is between 1 and 30.

8. A process according to claim 7, wherein the ratio is between 5 and 10.

9. A process according to claim 1, wherein the oxidation is carried out at room temperature and at atmospheric pressure.

10. A process according to claim 1, wherein the oxidation is carried out at a temperature between 10 and 50° C.

11. A process according to claim 1, wherein the reaction time is more than one hour.

12. A process according to claim 1, wherein the reaction time is from 1 to 2 days.

13. A process according to claim 1, wherein the 3-keto-5β-steroid oxidized is a 3-keto-5β-pregnane containing a dioxyacetone chain at the C-17 position.

14. A process according to claim 1, wherein the 3-keto-5β-steroid is a 3-keto-5β-pregnane containing a member selected from the group consisting of 17,20, 20,21 bis-methylenedioxy and 17,20, 20,21 bis-substituted methylenedioxy groups.

15. A process according to claim 1, wherein the $\Delta^4$ steroid compound finally produced is selected from the group consisting of 4-hydroxy-17α-methyl-testosterone, 4-hydroxy-17α-methyl - 19 - nor-testosterone, 4,11β-dihydroxy-17α-methyl-testosterone, 4-hydroxy-testosterone, 4-hydroxy-19-nortestosterone, 4,11β-dihydroxy-testosterone, 4,17α-dihydroxy-progesterone, 4-hydroxy-hydrocortisone, 4-hydroxy-cortisone, and 4-hydroxy Reichstein's Compound S.

No references cited.